United States Patent [19]

Bonko

[11] Patent Number: 5,188,683
[45] Date of Patent: Feb. 23, 1993

[54] PNEUMATIC TIRE FOR AGRICULTURAL OR LOGGING USE

[75] Inventor: Mark L. Bonko, Uniontown, Ohio

[73] Assignee: The Goodyear Tire & Rubber Company, Akron, Ohio

[21] Appl. No.: 688,213

[22] Filed: Apr. 22, 1991

[51] Int. Cl.$^5$ ............................................. B60C 11/00
[52] U.S. Cl. ................................... 152/209 B; 152/523
[58] Field of Search ........ 152/209 R, 209 B, 209 D, 152/523; D12/146-152

[56] References Cited

U.S. PATENT DOCUMENTS

| | | | |
|---|---|---|---|
| 3,457,981 | 7/1969 | Verdier | 152/209 B |
| 3,811,488 | 5/1974 | Duncan | 152/523 |
| 3,844,326 | 10/1974 | Verdier | 152/209 B |
| 4,446,902 | 5/1984 | Madec et al. | 152/209 B |
| 4,856,572 | 8/1989 | Casanova et al. | 152/523 |
| 4,995,437 | 2/1991 | Enoki et al. | |

FOREIGN PATENT DOCUMENTS

| | | | |
|---|---|---|---|
| 0086173 | 8/1983 | European Pat. Off. | |
| 2303675 | 10/1976 | France | |
| 0036139 | 3/1980 | Japan | 152/209 B |
| 1359465 | 7/1974 | United Kingdom | 152/523 |
| 1433410 | 4/1976 | United Kingdom | 152/209 B |

Primary Examiner—Michael W. Ball
Assistant Examiner—Nancy T. Krawczyk
Attorney, Agent, or Firm—David L. King

[57] ABSTRACT

A pneumatic tire particularly suited for agricultural or logging use is described. The tire has lateral-edge lugs with projections extending axially outward of the tire's maximum section width. The projections are radially inward of the ground contacting surface of the lug while also being radially outward of the inner tread surface. The projection extends axially inwardly and radially outwardly from the axially-outer-limit to the ground contacting surface of the tread lug. The projection further extends generally axially and radially inwardly from the axially-outer limit of the projection to the lateral edge of the inner tread surface from which the lug extends.

16 Claims, 8 Drawing Sheets

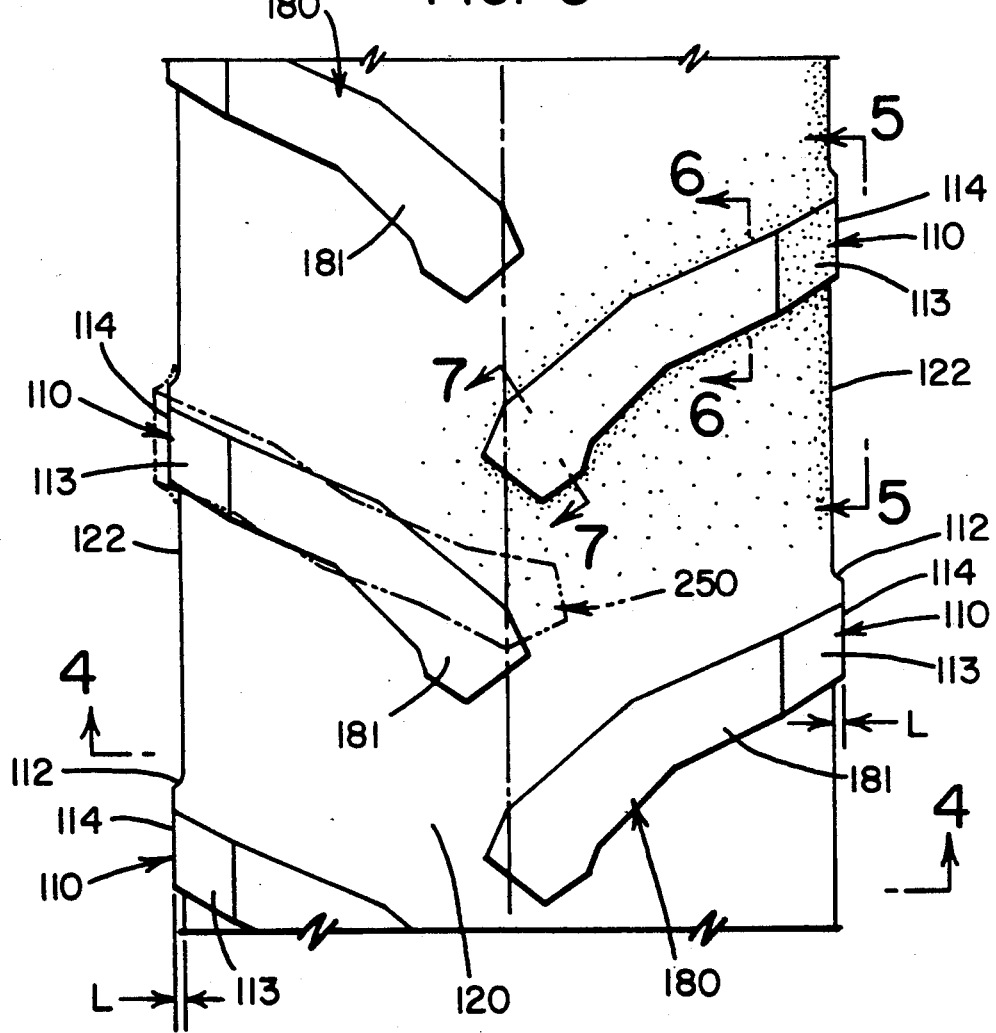

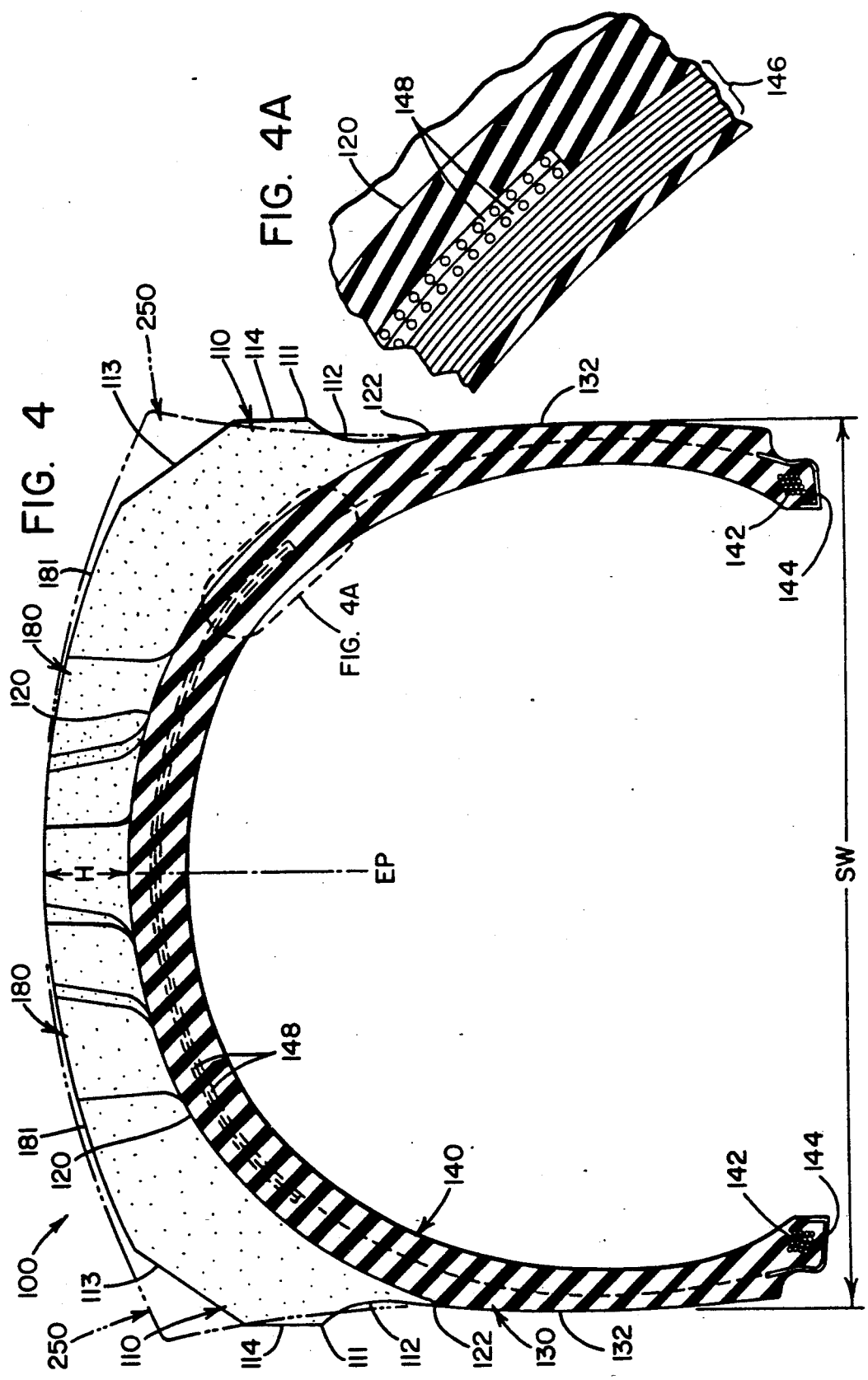

PNEUMATIC TIRE FOR AGRICULTURAL OR LOGGING USE

BACKGROUND OF THE INVENTION

This invention relates to a pneumatic tire particularly suited for agricultural or logging use. The tire being designed with lateral-edge lugs having axially extending projections.

Agricultural and logging tires are exposed to a variety of working conditions requiring the tire to function well on paved surfaces, loose soil and rough and rugged terrain. Under normal working conditions the tire traction is achieved by radially extending lugs. In some severe conditions, however, the tire must be adapted to accommodate chains to assist in providing tractive movement of the vehicle. The use of chains is particularly common in logging operations and during times of the year where there may be heavy snow and ice conditions.

The tires are designed with a relatively low net-to-gross ratio in the range of 25% to 40%. The net-to-gross ratio is the ratio of the percentage of the tire contacting a hard paved surface versus the overall contact area of the tire under a normally inflated and loaded condition. In an agricultural tire the lugs are circumferentially spaced such that the tire lugs dig into the soil and provide tractive movement while an inner tread surface provides flotation and support for the vehicle. Tires for use in logging operations are very similar to agricultural tires with the exception that the tire must be substantially more durable and the lugs must be structurally stronger.

In logging operations the tires are required to run over rugged terrain and are exposed to tree trunks and other obstacles that can cut a tire. The tires are driven over the felled trees and exposed to branches and other objects that can cut and severely damage either the inner surface of the tread or the lugs.

In order to overcome the severity of working conditions the logger tire is designed with a multiple ply carcass generally a minimum of eight plies are used. Radially outward of the carcass are two steel breakers designed specifically to prevent branches from penetrating through the inner tread surface. The sidewalls are beefed up substantially thicker than agricultural tires. And the lugs are substantially thicker and heavier braced than an agriculture tire.

The design of the logger tire is such that the lugs represent a large mass of rubber that must be cured during the manufacture of the tire. During the vulcanization process the rubber must be heated in order to adequately accomplish curing of the tire. The time required is a function of the thickness of the material and the chemical composition of the material to be cured. In a logging tire the thickest area or largest area of mass is at the lateral edge of the tread lugs. It currently takes approximately in excess of three hours to cure a typical conventional logger tire. The tire cure time is dictated by the thickness of the lug and cannot be decreased under conventional curing processes without sacrificing the quality of the tire cure.

Both the agricultural and logging tires once placed into use must be durable enough to accommodate the mounting of chains. The chains are used to provide additional traction when the weather or soil conditions are such that an increase in traction is required. The use of chains is particularly common in logging operations. The chains are mounted to a tire in such a fashion that the links of the chains provide excessive forces on any area of the tire that provides a sharp corner. In particular the lugs are extremely sensitive to accommodating chains and have been known to tear or crack as a result of chain usage. The chain mounted tire being driven over logs and branches is exposed to an environment that induces chain slippage either in the axially or circumferential direction. This movement of the chain relative to the tire increases the probability of tire damage, in particular the lateral edges of logging tires are known to be susceptible to tearing. After a short period of usage it is not uncommon to see a majority of the tread lugs damaged at the lateral edge. Solutions to chain damage have historically required the addition of more rubber which further increases the amount of time required to manufacture the tire.

SUMMARY OF THE INVENTION

A pneumatic tire for agriculture or logging use has a casing, an inner tread surface, and rows of circumferentially spaced tread lugs. The casing includes a pair of sidewalls having axially outermost surfaces defining the maximum section width of the tire. The inner tread surface is radially outward of the casing. The inner tread surface has a pair of lateral edges. The tire has at least two but not more than four rows of circumferentially spaced tread lugs radially extending outwardly from the inner tread surface to a ground contacting surface. The tire tread has a net-to-gross ratio in the range of 25% to 45%. The tire has at least one row of lateral-edge lugs extending circumferentially and axially inwardly from each lateral edge. The lateral-edge lugs each have a projection extending from the lug axially outwardly of the tire's maximum section width to an axially outer limit of the projection. The projection is radially inward of the ground contacting surface of the lug and is radially outward of the inner tread surface. The projection extends axially inwardly and radially outwardly from the axially-outer limit to the ground contacting surface of the tread lug. The projection further extends generally axially and radially inwardly from the axially-outer limit of the projection to the lateral edge of the inner tread surface from which the lug extends.

A portion of the projection which extends axially and radially inwardly from the axially outer limit of the lateral edge has a concave surface. The concave surface extends at least partially axially inward of the tire's maximum tire section width. The curvature is a single radius in the range of 2.5 cm to 10.0 cm thereby being suitable for accommodating traction chains.

The lugs are designed with a radially height of H as measured at the center plane of the tire perpendicularly outwardly from the inner tread surface. The lug height is measured from the inner tread surface is within a range of H and 150% of H at any axial location across the lug. The lug further is designed wherein the contact area decreases in width as it extends towards the lateral edge.

The tire is designed with a reduction in lug material at the lateral edge. This reduction in material enables the tire to be cured at a faster rate than the conventional prior art tire.

The design enables the tire to accommodate traction chains while reducing the vulnerability of the lugs at the lateral edge due to tearing as a result of chain slippage.

The projection accommodates a chain and reduces the chain's freedom to slip axially across the tread surfaces. By constraining the radial height of the lug and by providing a projection that angularly extends from an outer limit of the projection to the ground contacting surface of the tread lug the conventional sharp corner of the lug which is prone to breaking or tearing in the prior art tires is eliminated.

BRIEF DESCRIPTION OF THE DRAWINGS

FIG. 3 is an enlarged fragmentary view of a tread portion of a tire according to one embodiment of the invention.

FIG. 4 is a further enlarged cross sectional view of the tire taken along lines 4—4 of FIG. 3.

FIG. 4A, is a further enlarged view of a portion of the tire and illustrates the two steel breakers and ply construction. The view taken from FIG. 4 as indicated.

DETAILED DESCRIPTION OF THE PREFERRED EMBODIMENT

Figure 1:
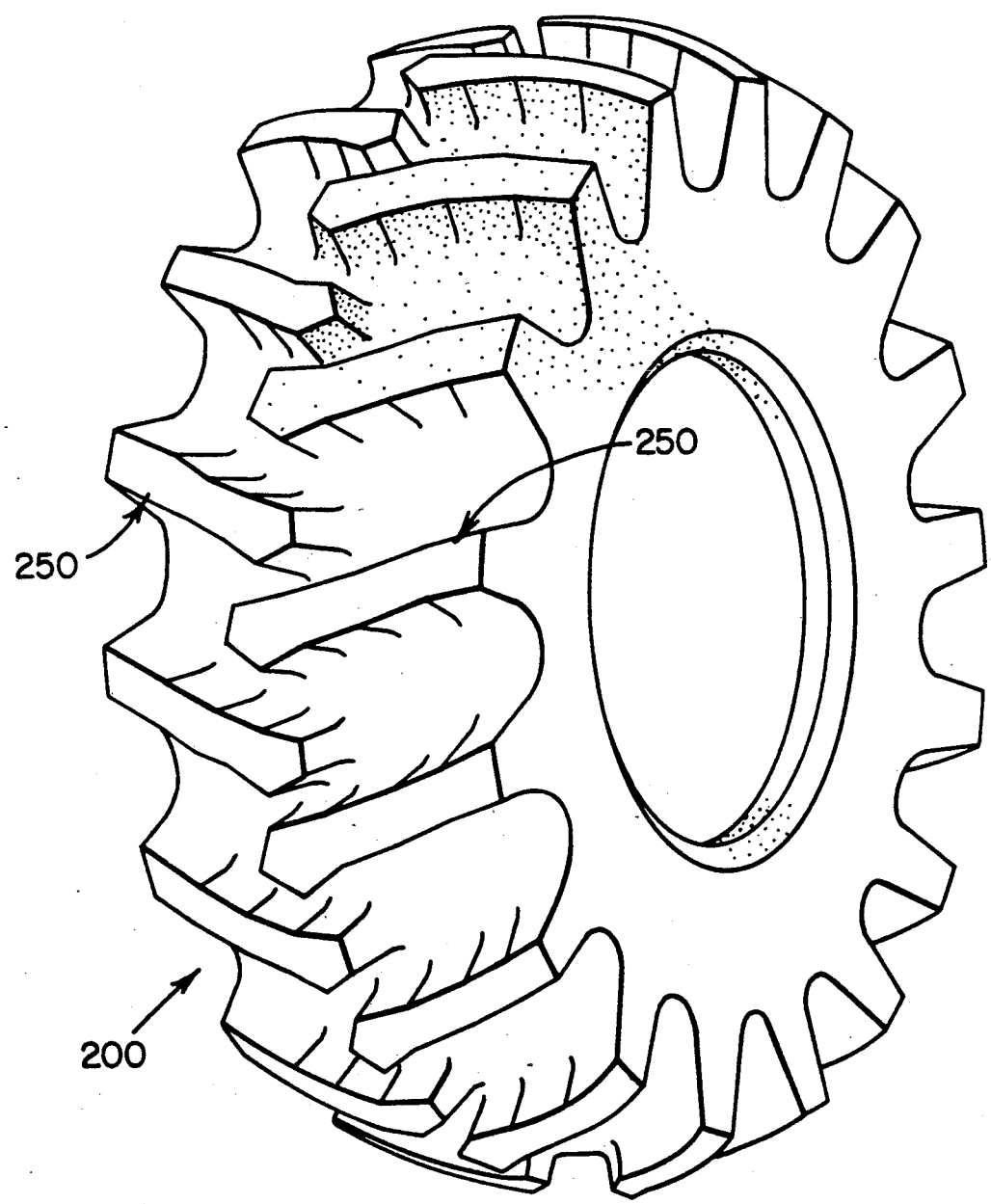
FIG. 1 illustrates a prior art logger tire.

The invention also may be better understood in the context of the following definitions, which are applicable to both the specification and the appended claims.

"Aspect Ratio" of the tire means the ratio of its section height (SH) to its section width (SW) multiplied by 100% for expression as a percentage.

"Axial" and "Axially" are used herein to refer to lines or directions that are parallel to the rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt Reinforcing Structure" means at least two layers or plies of parallel cords, woven or unwoven, underlying the tread, unanchored to the bead, and having both left and right cord angles in the range from 17° to 27° with respect to the equatorial plane of the tire.

"Carcass" means the tire structure apart from the belt structure, tread, undertread, and sidewall rubber over the plies, but including the beads.

"Casing" means the carcass, belt structure, beads, sidewalls, and other components of the tire excepting the tread and the undertread.

"Chafers" refers to narrow strips of material placed around the outside of the beads to protect cord plies from the rim, distribute flexing above the rim, and to seal the tire.

"Chipping" loss of small pieces of tire due to rough terrain.

"Equatorial Plane (EP)" means the plane perpendicular to the tire's axis of rotation and passing through the center of its tread.

"Footprint" means the contact patch or area of contact of the tire tread with a flat surface at 0 speed and under normal load and pressure.

"Ground Contacting Surface" is defined as the surface of a tread lug within a footprint of the tire mounted to a vehicle loaded and under normal inflation that contacts a hard paved surface.

"Inner" means toward the inside of the tire and "Outer" means toward its exterior.

"Inner Tread Surface" is used herein to define tread material directly radially outward of the casing.

"Lateral Edge" is defined as the axially outermost annular broken line between lugs and is the axially outermost line (edge) from which the lugs extend radially outwardly to the ground contacting surface. The lateral edge is the axial extreme on each side of the tire defining the tread width.

"Net-to-Gross Ratio" means the ratio of the tire tread rubber as it makes contact with the road surface while in the footprint, divided by the area of the tread in the footprint, including non-contacting portions, such as grooves.

"Normal Inflation Pressure" refers to the specific design inflation pressure and load assigned by the appropriate standards organization for the service condition for the tire.

"Normal Load" refers to the specific design inflation pressure and load assigned by the appropriate standards organization for the service condition for the tire.

"Radial" and "Radially" are used to mean directions radially toward or away from the axis of rotation of the tire.

"Radial-ply Tire" means the belted or circumferentially-restricted pneumatic tire in which the ply cords which extend from bead to bead are laid at cord angles between 65° and 90° with respect to the equatorial plane of the tire.

"Section Height (SH)" means the radial distance from the nominal inner diameter to the outer diameter of the tire in its equatorial plane.

"Section Width (SW)" means the maximum linear distance parallel to the axis of the tire and between the exterior of its sidewalls when and after it has been inflated at normal pressure for 24 hours, but unloaded, excluding elevations of the sidewall due to labeling, decoration or protective bands.

"Sidewall" means that portion of the tire between the tread and the bead.

"Tire Design Load" is the base or reference load assigned to a tire at a specific inflation pressure and service condition; other load-pressure relationships applicable to the tire are based on that base or reference load.

"Tread Width" means the arc going up the tread surface in the axial direction, that is in a plane passing through the axis of rotation of the tire.

"Tread Arc Width" (TAW) means the width of an arc having its center location on the plane (EP) and which substantially coincides with the radially outer most surface of the various traction elements (lugs, blocks, buttons, ribs, etc) across the lateral or axial width of the tread portion of a tire when the tire is mounted upon its designated rim and inflated to its specified inflation pressure but not subject to any load.

In the drawings, the same numerals are used to designate the same components or items in the several views.

With particular reference now to FIG. 1, a prior art logging tire 200 is illustrated, the tire 200 having a pair of circumferentially spaced rows of lugs 250 extending from lateral edges.

Figure 2A:
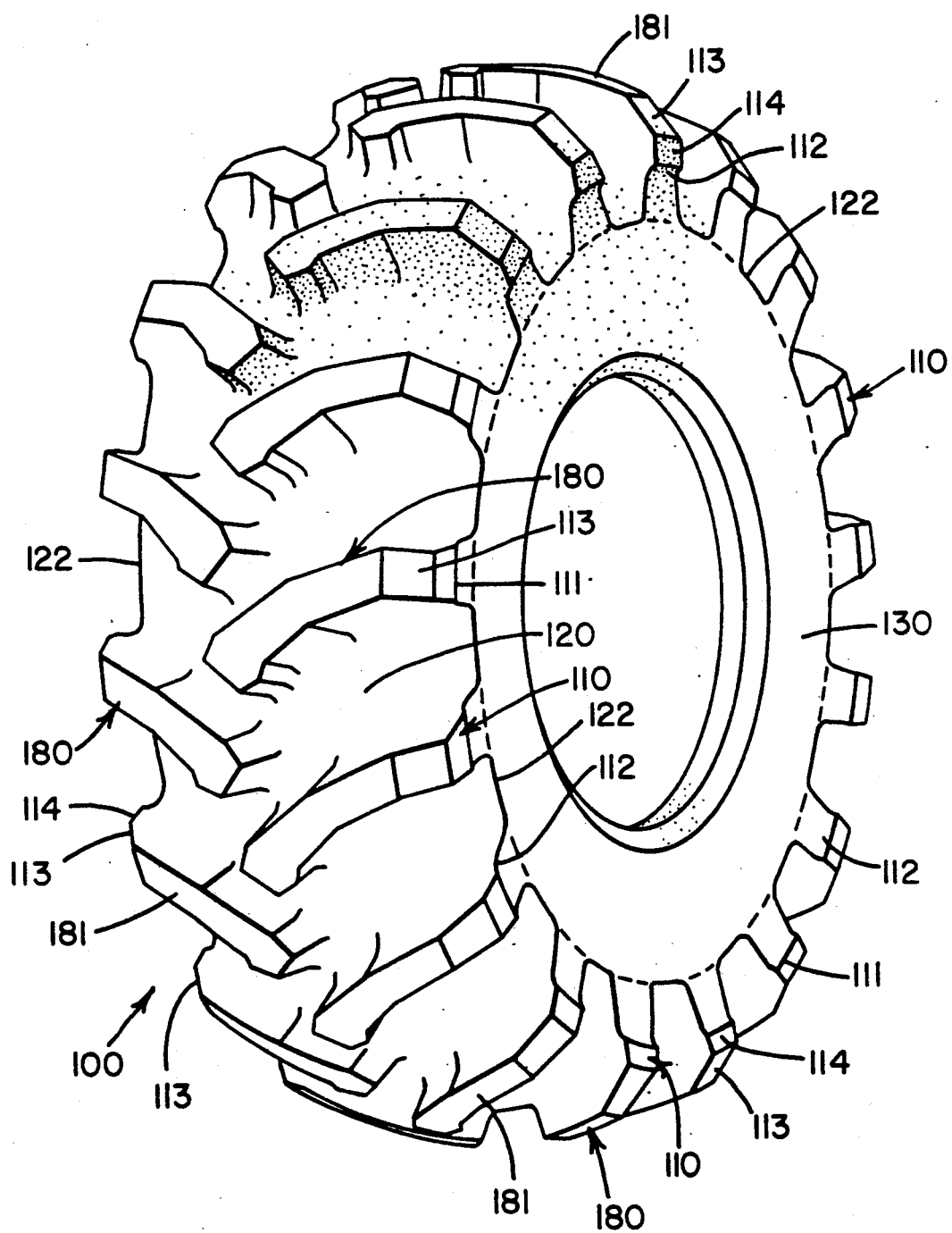
FIG. 2A illustrates the pneumatic tire for agricultural or logging use, the tire having a plurality of circumferentially spaced lateral edge lugs having axially extending projections.
Figure 2B:
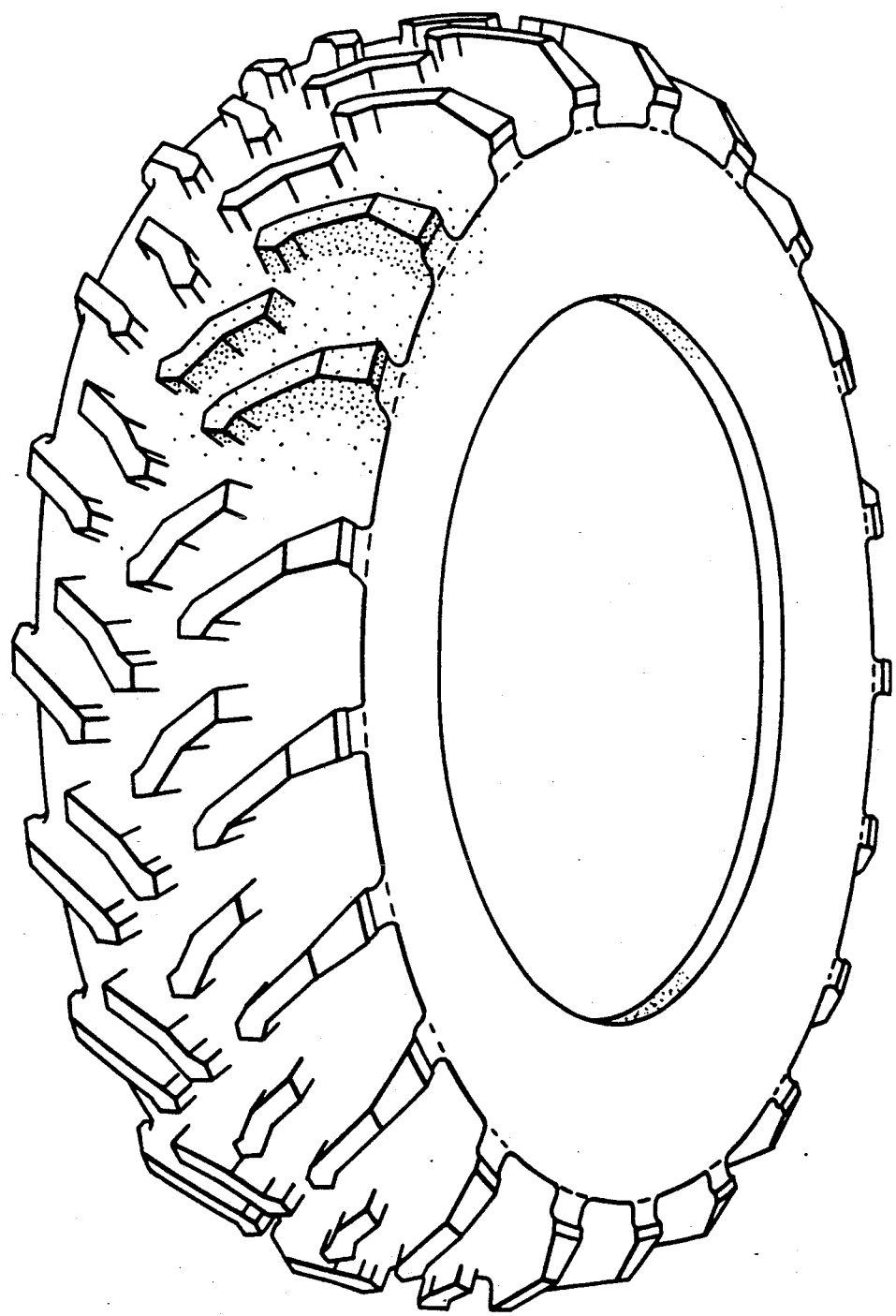
FIG. 2B is an alternate embodiment of the claimed invention, the tire having four rows of tread lugs.

FIG. 2A illustrates a pneumatic tire 100 particularly suited for agricultural or logging operations. The illustrated tire 100 has two rows of circumferentially spaced lateral-edge lugs 180 extending radially outwardly from an inner tread surface 120. The lateral-edge lugs 180 extend axially inwardly from a lateral edge 122. Each lug has a axially extending projection 110 extending therefrom. A sidewall 130 extends radially inwardly from the lateral edge 122 as illustrated in FIG. 2A.

FIG. 3 is a fragmentary view of a tread portion of the tire illustrated in FIG. 2A. The tread portion illustrates a plurality of lateral-edge lugs 180 extending from lateral edges 122 one lateral edge is depicted on each axially opposite side of the inner tread surface 120. A phantom line showing the prior art lug 250 is superimposed over one of the lateral-edge lugs 180. A ground contacting surface 181 is illustrated. The ground contacting surface 181 is a radially outward surface of the lateral-edge lug 180. An axially extending projection 110 is illustrated as part of the lug 180. The projection is illustrated with a substantially flat surface 113 extending from the ground contacting surface 181 of the lateral-edge lug 180 to axially outer limit 111 of the projection. The projection 110 is illustrated extending from a lateral edge 122 and has a concave surface 112 extending to a substantially flat surface 114. The substantially flat surface 114 extends from an axially outer limit 111 to the substantially flat surface 113. As illustrated the projections 110 extend axially outward from the tread width the distance L on each side of the inner tread surface 120.

FIG. 4 is a cross sectional view of the tire 100 illustrating the casing 130, and the radially outwardly extending inner tread surface 120 with lateral-edge lugs 180 extending therefrom. The casing 130 includes a pair of annular beads 142, a pair of chafers 144, and a carcass 140. Extending from the carcass is a pair of sidewalls 132 and a pair of breakers 148.

FIG. 4A is an enlarged view of the casing illustrating the breakers 148 and the multiple reinforcing plies 146. The axially-outer-surface of the sidewalls 132 defines the tire's section width SW. The cross section further illustrates the equatorial plane of the tire as it passes through the cross section. A phantom line depicts the prior art lugs 250 superimposed over the lateral-edge lugs 180. The lateral-edge lugs 180 are shown extending radially outwardly from the inner tread surface and extending axially outward. The lateral-edge lugs 180 are depicted axially extending toward projections 110. The axial projections 110 extend to the axial outer limit 111. The projections extend axially outwardly and radially inwardly from the ground contacting surface 181. The projection 110 has a substantially flat surface 113 which is inclined at least 25° with respect to the axis of rotation of the tires. The substantially flat surface 113 extends to a second substantially flat surface 114. The second substantially flat surface 114 extends to the axially outer limit 111. The projection 110 further includes a surface 112 extending from the lateral edge 122 of the inner tread surface 120 to the axially outer limit 111 of the projection 110. The surface 112 is curved concavely. As illustrated the concave curvature has a single radius of curvature which extends at least partially axially inwardly of the lateral edge of the inner tread surface.

An improved pneumatic tire 100 for agricultural or logging use is described. The improvement in the tire comprises lateral-edge lugs 180 having axially outwardly extending projections 110. The projections 110 extend outward of the tire's maximum section width to an axially outer limit 111. Each projection 110 is radially inward of the ground contacting surface 181 of the lug 180 and radially outward of the inner tread surface 120. The projections 110 extend axially inwardly and radially outwardly from the axially outer limit 111 to the ground contacting surface 181 of the tread lug 180. The projections 110 further extend generally axially and radially inwardly from the axially outer limit 111 of the projections 110 to the lateral edge 122 of the inner tread surface 120 from which the lug extends.

As illustrated in FIG. 4 the lateral-edge lugs have a radial height H extending perpendicularly from the inner tread surface 120 to the ground contacting surface 181 as measured at the center plane of the tire. The radial height of the lug 180 is not greater than 150% of H at any other axial location. In the prior art tire 200 the lugs 250 have an increasing radial height. The height increases from the equatorial plane to a maximum at the lateral edge of the tread lug 250. In a typical prior art tire the lug height at a lateral edge equals 161% of the minimum lug height. The lateral-edge lug of the present invention has a chamfered corner at the lateral edge. The chamfered corner is defined by a substantially flat surface 113. In the preferred embodiment the maximum height of the lug relative to the radial height H is 141%. The chamfering of the corner of the lateral-edge lug 180 reduces the amount of material used in the tire and it eliminates an area of the lug which is prone to chipping or tearing away under normal use conditions. In logging operations this area is particularly prone to chain damage.

An alternative embodiment of the present invention would be to have the substantially flat surface 113 convexly curved and extending from the ground contacting surface 181 to the substantially flat second surface 114.

Figure 5:
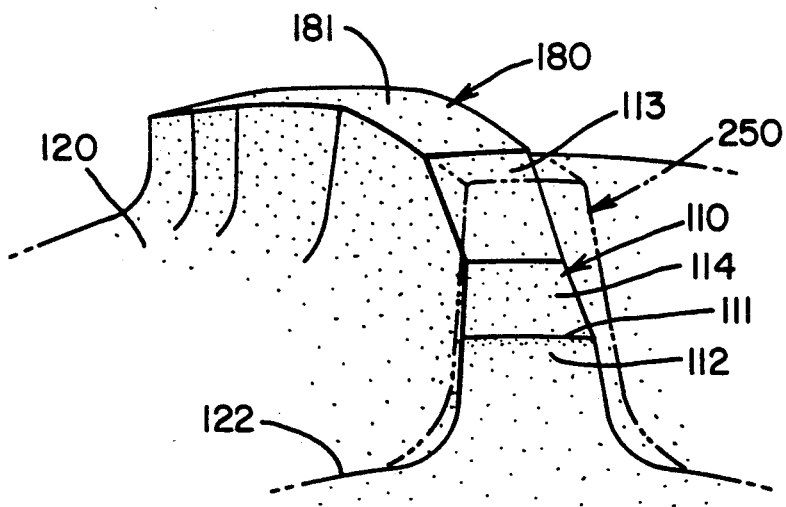
FIG. 5 is a fragmentary view of a radially extending tread lugs taken along line 5—5 of FIG. 3.

FIG. 5 is a view illustrating the lateral-edge lug 180 extending radially outward from the inner tread surface 120. Superimposed over the lateral-edge lug 180 is that portion of the prior art lug 250 as illustrated in the phantom line. The radially outer surface of the lug 180 is the ground contacting surface 181. The lateral-edge lug extends from the inner tread surface starting at the lateral tread edge 122 and extending radially outwardly to the projection 110.

Figure 6:
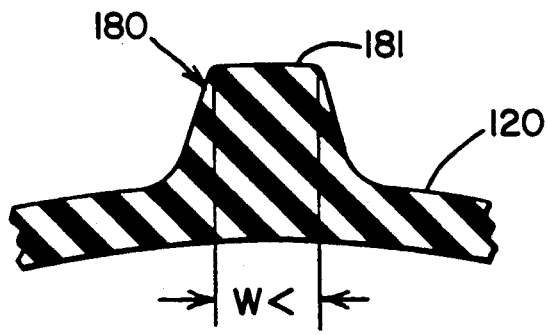
FIG. 6 is a cross sectional view of a tread lug taken from along line 6—6 of FIG. 3.
Figure 7:
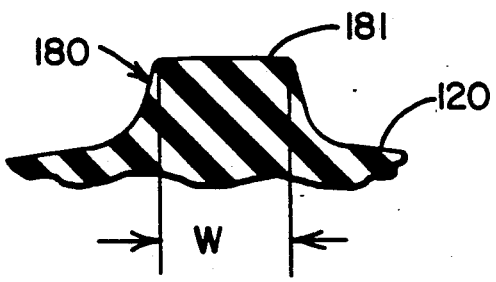
FIG. 7 is a cross sectional view of the tread lug taken along line 7—7 of FIG. 3.

FIGS. 6 and 7 illustrate a cross sectional view of the lateral-edge lug 180 taken from FIG. 3. The cross sectional view of FIG. 7 being closer to the equatorial plane of the tire than the cross-section of FIG. 6 illustrates that the height of the lug increases as the lug extends from the equatorial plane axially.

As illustrated in FIG. 3 the ground contacting surface 181 decreases in width as it extends towards a lateral edge 122. By comparing FIG. 6 with FIG. 7, it can be seen that the thickness of the lug is narrowed as the height of the lug increases. The lug 180 has a cross sectional area that is approximately constant within a range of 90% to 110% over 90% of the lug's length in the region radially inward of the ground contacting surface 181. The prior art lug 250 as illustrated in phantom line in FIG. 3 had a relatively constant width at the ground contacting surface area. As the lug extends axially outwardly to a lateral edge this constant width in combination with an increasing radial height resulted in a maximum amount of material at the lateral edge of the lug. This maximum material in combination with the overall tire structure dictates the amount of time required to vulcanize the tire. Reduction of this mass of material at the lateral edge enables the illustrated tire of the present invention to be vulcanized with an overall cure cycle approximately 30 minutes shorter than the prior art tire. The prior art tire had an overall cure cycle in excess of 3 hours.

Figure 8:
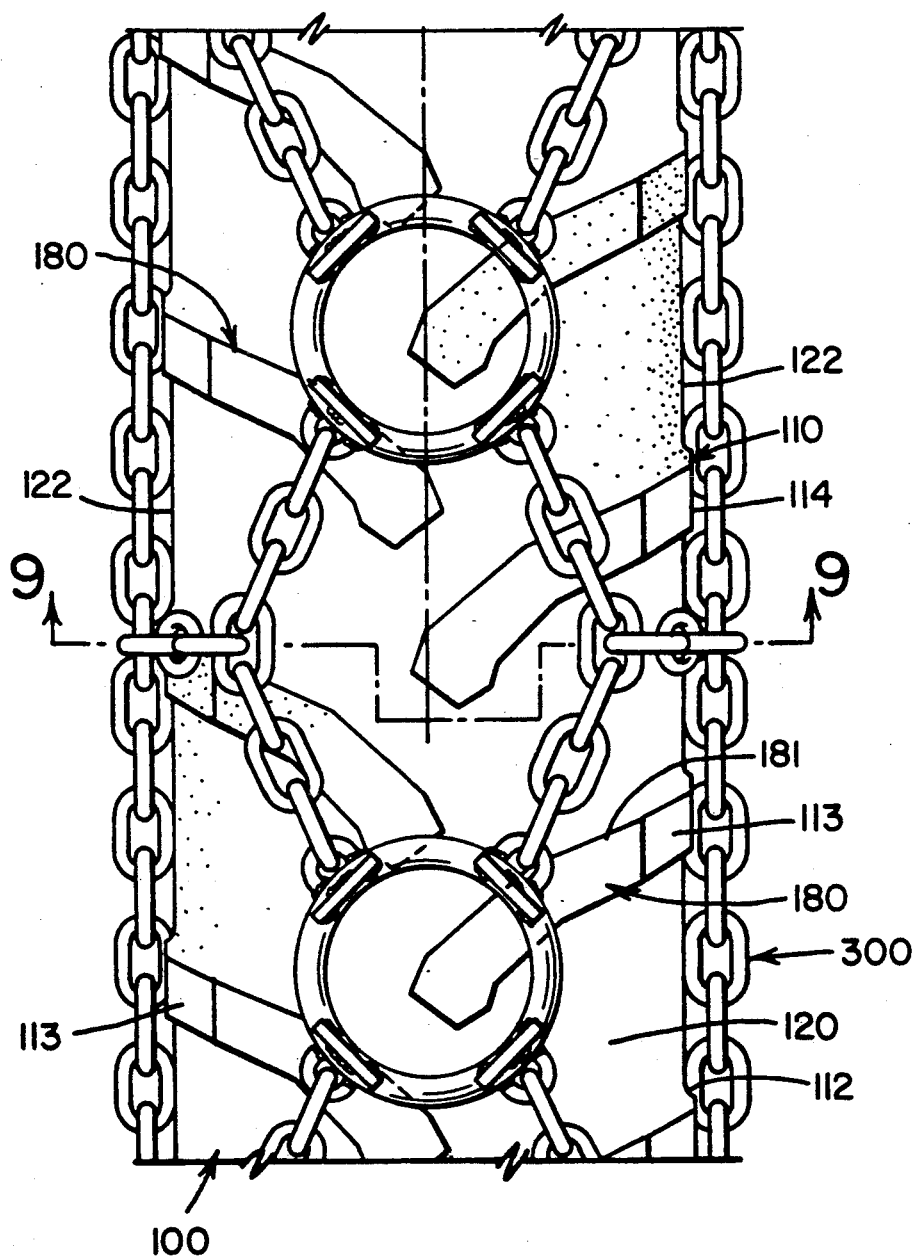
FIG. 8 is a fragmentary view of the tread portion of the tire illustrating a traction chain mounted thereto.

FIG. 8 further illustrates a fragmentary portion of the tread with a traction chain 300 mounted thereto.

The axially extending projection 110 has a concave surface 112 extending axially and radially inwardly from the axial outer limit to the lateral edge. The concave surface extends at least partially axially inward of the tire's maximum section width in the preferred embodiment. The curvature is a single radius curvature R in the range of 2.5 cm to 10.0 cm thereby being suitable for accommodating traction chains. The radius of curvature R preferably is in a range of radii between 5.0 cm and 7.5 cm. In the preferred embodiment the radius R is 6.25 cm.

Figure 9:
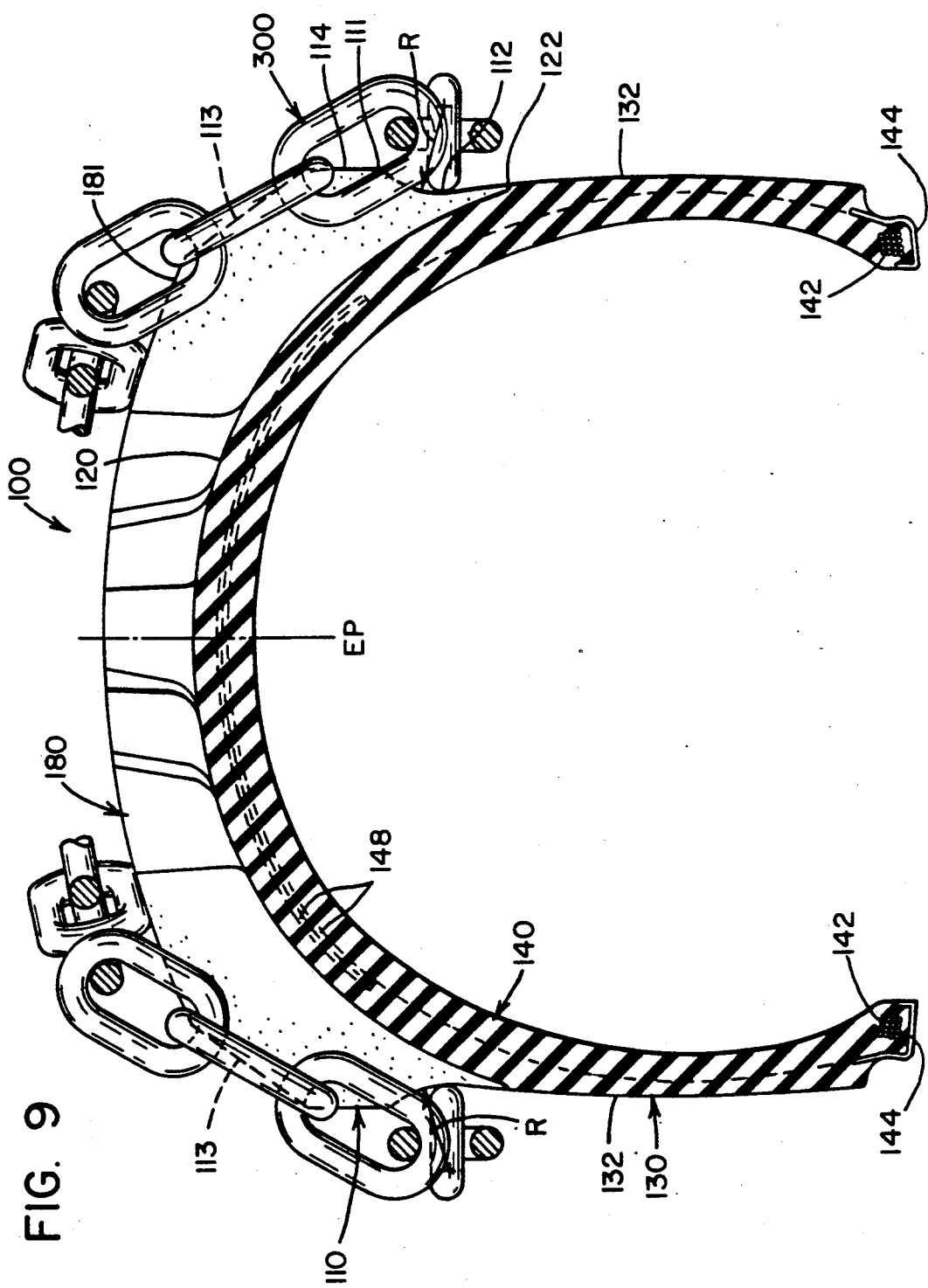
FIG. 9 is a cross sectional view of the tire with a chain mounted thereto taken along line 9—9 of view 8.

As illustrated in FIG. 9, the projections extend axially outward of the sidewall of the tire. When chains are mounted to this tire, they are partially nested within the concave curvature of the projection. This reduces the tendency for the chain 300 to axially slip across the tread's surface. Reducing the relative movement of the chain across the tread surface decreases the potential of lug damage. Tread lug 180 has an enlarged ground contacting surface area near the equatorial plane of the tire to further provide better support for the traction chain 300. The axially extending projection 110 and the chamfer of the lug near the lateral edge 122, provide a significant redution in chain-related damage.

The projection 110 further provides sidewall protection by extending axially outward of the maximum section width of the tire. The lug with extended projection is capable of deflecting objects including branches from the sidewall in the area radially inward from the projection.

What is claimed is:

1. An improved pneumatic tire for agricultural or logging use having a casing, the casing including a pair of sidewalls having axially outermost surfaces defining the maximum section width of the tire, an inner tread surface radially outward of the casing the inner tread surface having a pair of lateral edges, at least two but not more than four rows of circumferentially spaced tread lugs radially extending outwardly from the inner tread surface to a ground contacting surface, the tread having a net-to-gross ratio in the range of 25% to 45%, at least one row of lateral-edge lugs extending circumferentially and axially inwardly from each lateral edge, wherein the improvement comprises:
    the lateral-edge lugs each having a projection extending from the lug axially outward of the tire's maximum section width to an axially outer limit of the projection, the projection being radially inward of the ground contacting surface of the lug and radially outward of the inner tread surface, the projection extending axially inwardly and radially outwardly from the axially-outer limit to the ground contacting surface of the tread lug and extending generally axially and radially inwardly from the axially-outer limit of the projection to the lateral edge of the inner tread surface from which the lug extends the portion of the projection which extends axially and radially inwardly from the axially outer limit to the lateral edge has a surface which extends at least partially axially inward of the tire's maximum section width.

2. The tire of claim 1, in which the portion of the projection which extends axially and radially inwardly from the axially outer limit to the lateral edge has a concave surface.

3. The tire of claim 2, the concave surface being formed by a radius of curvature in the range from 2.5 cm to 10.0 cm, the tire thereby being suitable for accommodating traction chains.

4. The tire of claim 3 wherein the radius of curvature is in the range from 5.0 cm to 7.5 cm the tire thereby being suitable for accommodating traction chains.

5. The tire of claim 1, wherein the extension of the projection between the axially outer limit and the ground contacting surface of the lug has a substantially flat surface.

6. The tire of claim 5, wherein the substantially flat surface is inclined at least 25° with respect to the axis of rotation of the tire.

7. The tire of claim 5, wherein the projection has a second substantially flat surface located between the concave surface and the substantially flat surface, the second substantially flat surface being generally perpendicular to the axis of rotation of the tire.

8. The tire of claim 1, wherein the lugs have a radial height measured perpendicularly from the inner tread surface to the radially outer ground contacting surface of the lug, the height being a distance H at a location midway between the section width of the tire and between 100% and 150% of H at any other axial location.

9. The tire of claim 8 wherein the contact area of the lugs decrease in width as it extends toward the lateral edge.

10. An improved pneumatic tire for agricultural or logging use having a casing, the casing including a pair of sidewalls having axially outermost surfaces defining the maximum section width of the tire, a minimum of eight carcass plies, and at least two steel belts, an inner tread surface radially outward of the casing, the inner tread surface having a pair of lateral edges, at least two but not more than four rows of circumferentially spaced tread lugs radially extending outwardly from the inner tread surface to a ground contacting surface, the tread having a net-to-gross ratio in the range of 25% to 45%, at least one row of lateral-edge lugs extending circumferentially and axially inwardly from each lateral edge, wherein the improvement comprises:
    the lateral-edge lugs each having a projection extending from the lug axially outward of the tire's maximum section width to an axially outer limit of the projection, the projection being radially inward of the ground contacting surface of the lug and radially outward of the inner tread surface, the projection extending axially inwardly and radially outwardly from the axially-outer limit to the ground contacting surface of the tread lug and extending generally axially and radially inwardly from the axially-outer limit of the projection to the lateral edge of the inner tread surface from which the lug extends, the portion of the projection which extends axially and radially inwardly from the axially outer limit to the lateral edge has a surface which extends at least partially axially inward of the tire's maximum section width, and wherein the lug has a radial height measured perpendicularly from the inner tread surface to the radially outer ground contacting surface of the lug, the height being a distance H at a location midway between the section width of the tire and between 100% and 150% of H at any other axial location and the contact area of the lug decreases in width as it extends toward the lateral edge.

11. The tire of claim 10, in which the portion of the projection which extends axially and radially inwardly from the axially outer limit to the lateral edge has a concave surface.

12. The tire of claim 11, the concave surface being formed by a radius of curvature in the range from 2.5 cm to 10.0 cm, the tire thereby being suitable for accommodating traction chains.

13. The tire of claim 12, wherein the radius of curvature is in the range from 5.0 cm to 7.5 cm, the tire thereby being suitable for accommodating traction chains.

14. The tire of claim 10, wherein the extension of the projection between the axially outer limit and the ground contacting surface of the lug has a substantially flat surface.

15. The tire of claim 14, wherein the substantially flat surface is inclined at least 25° with respect to the axis of rotation of the tire.

16. An improved pneumatic tire for agricultural or logging use having a casing, the casing including a pair of sidewalls having axially outermost surfaces defining the maximum section width of the tire, an inner tread surface radially outward of the casing, the inner tread surface having a pair of lateral edges, at least two but not more than four rows of circumferentially spaced tread lugs radially extending outwardly from the inner tread surface to a ground contacting surface, the tread having a net-to-gross ratio in the range of 25% to 45%, at least one row of lateral-edge lugs extending circumferentially and axially inwardly from each lateral edge, wherein the improvement comprises:

the lateral-edge lugs each having a projection extending from the lug axially toward of the tire's maximum section width to an axially outer limit of the projection, the projection being radially inward of the ground contacting surface of the lug and radially outwardly of the inner tread surface, the projection extending axially inwardly and radially outwardly from the axially-outer limit to the ground contacting surface of the tread lug and extending generally axially and radially inwardly from the axially-outer limit of the projection to the lateral edge of the inner tread surface from which the lug extends, the portion of the projection which extends axially and radially inwardly from the axially outer limit to the lateral edge has a surface which extends at least partially axially inward of the tire's maximum section width, and wherein the lug has a radial height measured perpendicularly from the inner tread surface to the radially outer ground contacting surface of the lug, the height being a distance H at a location midway between the section width of the tire and between 100% and 150% of H at any other axial location and the contact area of the lug decreases in width as it extends toward the lateral edge.

* * * * *